US006970173B2

(12) United States Patent
Ciolac

(10) Patent No.: US 6,970,173 B2
(45) Date of Patent: Nov. 29, 2005

(54) SYSTEM FOR PROVIDING MULTIPLE DISPLAY SUPPORT AND METHOD THEREOF

(75) Inventor: Alec A. Ciolac, Toronto (CA)

(73) Assignee: ATI Technologies, Inc., Thornhill (CA)

( * ) Notice: Subject to any disclaimer, the term of this patent is extended or adjusted under 35 U.S.C. 154(b) by 3 days.

(21) Appl. No.: 09/954,685

(22) Filed: Sep. 14, 2001

(65) Prior Publication Data

US 2003/0048275 A1 Mar. 13, 2003

(51) Int. Cl.[7] ................................................ G06F 12/02
(52) U.S. Cl. ......................... 345/544; 345/545; 345/1.1
(58) Field of Search ................................ 345/501–506, 345/519–520, 522, 530–574, 778, 1.1–3.4

(56) References Cited

U.S. PATENT DOCUMENTS 6,232,932 B1 * 5/2001 Thorner ...................... 345/1.3
6,411,302 B1 * 6/2002 Chiraz ........................ 345/545

* cited by examiner

*Primary Examiner*—Kee M. Tung
(74) *Attorney, Agent, or Firm*—Toler, Larson & Abel, LLP

(57) ABSTRACT

A system and method is provided for supporting a multiple display configuration through a single connected display device. The present disclosure allows a system desktop to be expanded across multiple virtual displays without a need for extra hardware to support multiple display devices. A display driver partitions a frame buffer of a video card into portions. Each portion is used to support a different virtual display. The display driver reports a number of virtual displays to an operating system and provides pointers to addresses associated with the portions of the frame buffer. The operating system treats each frame buffer portion as a separate frame buffer and stores video data for each virtual display in an associated frame buffer portion. The display driver selects a virtual display from a set of multiple virtual displays and routes video data from the frame buffer portion associated with the selected display for output on a connected display device.

43 Claims, 5 Drawing Sheets

SYSTEM FOR PROVIDING MULTIPLE DISPLAY SUPPORT AND METHOD THEREOF

FIELD OF THE DISCLOSURE

The present invention relates generally to displaying video and more particularly to providing video associated with multiple displays.

BACKGROUND

Information handling systems generally use a display device for presenting data to a user. Applications running within the information handling system may provide video and text to a display controller for displaying images associated with the applications on a screen of the display device. Under particular operating systems, such as Microsoft Windows operating systems and Apple Macintosh operating systems, different applications are provided in different windows. Each window may display data or a graphical user interface (GUI) of an associated application. The user may size and move the window to desired portions of the screen of the display device for viewing data associated with the application. The user may even select to open a window associated with an application to fill the viewable area of the display.

While different windows provide access to multiple applications, problems occur when dealing with multiple windows on the same screen. Many users require multiple applications to be running simultaneously. Software programmers may need various windows for displaying program code associated with different programs, as well as displaying code for debugging on some windows and executing code on other windows. Web designers rely on different windows for displaying different pages being designed. To gain access to a particular application currently running, the user must select among the available windows. When many applications are running concurrently, the screen of the display device may appear cluttered. It may become difficult for a user to select a desired window of a particular application. The user must resize, minimize, or move some of the open windows to access or view a desired window. Some applications also spawn new windows, such as windows for performing document searches or spell checks. The spawned windows may "pop-up" and appear over particular portions of the screen the user may need to see. Some users need more visible screen space to have windows associated with different applications visible. For example, financial managers need to view application windows for a variety of financial data such as market movement, news feeds, and stock analysis. Financial managers need to be able to switch between application windows providing portions of the financial data quickly, without having to deal with the nuances of moving windows and switching between windows.

One solution to the problem of limited visible screen space is to use a display device with a larger screen. Using a display device with a larger screen provides a limited solution. The display screen is still limited and may still not be large enough for users needing to switch between concurrently running applications. An alternate solution is to use multiple display devices. Some operating systems provide support for spanning the system's viewable desktop over the screens of multiple display devices. Windows associated with different application programs may be assigned to different connected display devices. Users may view a window associated with one application on a screen of a first display device and a window associated with another application on a screen of another display device. A user may simply move a mouse cursor past the edge of one screen to access a window on another screen. Windows may also be expanded to span screens from multiple display devices, allowing the window to be stretched to a larger size than offered by a screen from a single display device.

While windows may be spanned across screens from multiple display devices to get a larger effective screen size, using multiple display devices may become expensive and unfeasible for some systems. Purchasing multiple display devices for each single system may become expensive when providing multiple display support for a number of different systems. Each connected display device also takes up physical desk space. Supporting a large number of connected display devices becomes limited to by the amount of physical space a person has to place the connected displays. Furthermore, hardware support must be provided for each connected display device. A cathode ray tube (CRT) controller is provided to send video for display on the screen of a display device. Each CRT controller is generally provided through a different video card with a video port for connecting to a display device. Multiple display devices are also not feasible for use through a portable computer, such as a laptop. Internal space for hardware within a laptop is very limited due to the amount of space needed for critical system components, such as hard disk space, batteries, and memory. Space for providing hardware support to connect to more than one external display device is generally not available, although some laptops allow for a connection to a single external display device. While the laptop desktop may be expanded across to the screen of the external display device and a screen of a display device integrated to the laptop, forcing a laptop to be connected to an external display device limits the portability of the laptop.

Some hardware programs condense video intended for multiple display devices onto a single display device; however, these hardware programs are designed to work with sets of hardware components dedicated to each display of the multiple display devices to be supported. For example, the hardware generally includes separate frame buffers or CRT controllers for each display of the multiple display devices to be supported. Furthermore, video intended for each of the multiple displays is provided in small portions of the screen in the single display device. For example, to support four different display devices, the screen of the single display device is quartered, providing only a fourth of the screen for each supported display device. As more displays are supported, the individual screen portions become so small as to make it difficult to identify objects or read text. From the above discussion, it is apparent that an improved method of providing an expanded desktop space would be useful.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

One embodiment of the present invention provides for a method of initializing a multiple display configuration in a system with a single display device. The method includes determining a number of virtual displays in a plurality of virtual displays to be supported. In one embodiment, the plurality of virtual displays are to be supported as a multiple display configuration. The method also includes partitioning a frame buffer into a plurality of frame buffer portions. The plurality of frame buffer portions include a first frame buffer portion associated with a first virtual display of the plurality of virtual displays and a second frame buffer portion associated with a second virtual display of the plurality of virtual displays. The method also includes reporting the number of virtual displays as a number of display devices. The method also includes providing a first address associated with the first frame buffer portion. The first address is reported as an address of a first frame buffer associated with a first display device. The method further includes providing a second address associated with the second frame buffer portion. The second address is reported as an address of a second frame buffer associated with a second display device.

Figure 1:
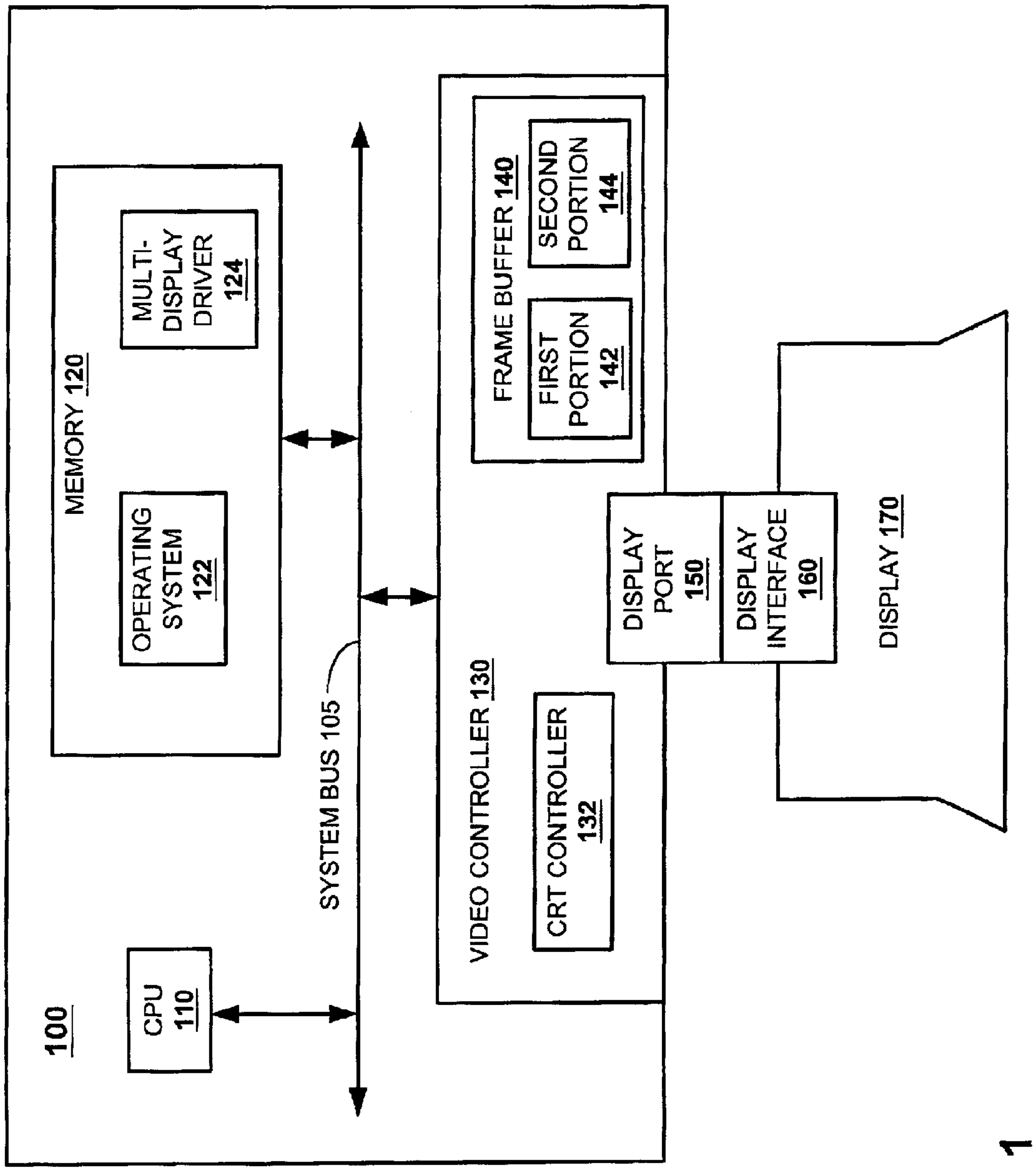
FIG. 1 is a block diagram illustrating a system for providing support for multiple virtual displays using a single display controller and a single display device, according to one embodiment of the present disclosure.

Referring now to FIG. 1, a block diagram illustrating a system for providing multiple virtual display screen support using a single display device is shown and referenced generally as system 100, according to one embodiment of the present disclosure. A display driver 124 divides system resources, such as frame buffer 140 for supporting multiple virtual displays. Display driver 124 is a multiple display driver used to support a multiple display configuration for operating system 122. The multiple virtual displays act as multiple connected display devices being tracked by display driver 124. The display driver 124 selects a virtual display device (not shown) of the multiple virtual displays and sends instructions to video controller 130 to provide video associated with the selected virtual display to a physical display device, display device 170.

A system processor 110 is used to perform general processing functions for system 100, such as running operating system 122 and display driver 124 stored in memory 120. Upon a system boot-up, operating system 122 of system 100 loads display driver 124 into memory 120. In one embodiment, operating system 122 includes an operating system, such as Microsoft Windows 98 or Microsoft Windows 200 operating systems, with built-in support for expanding a viewable system desktop across multiple displays. The viewable system desktop is generally used to describe the screen space provided for a user within an operating system environment. The system desktop is the area in which a user can open and move application windows. Generally, the system desktop is the maximum viewable area available through the connected display device, such as display device 170; however, when multiple display devices are supported by operating system 122, the system desktop may be expanded to fit across a number of display screens. The user may then open application windows on screens of any of the available virtual displays. The user may also expand or move application windows to stretch across screen boundaries. Portions of an application window may be found on more than one virtual display screen. Operating system 122 queries display driver 124 to determine a number of connected display devices.

In one embodiment, a user selects a number of desired virtual display devices to be supported and a resolution associated with each virtual display, as discussed subsequently with reference to FIG. 5. Display driver 124 uses the user specifications to divide available system resources to match the number of virtual displays being requested by the user. In one embodiment, display driver 124 partitions an available frame buffer 140 of video controller 130 to match the number and type of virtual displays specified by the user. For example, if one of the virtual displays is requested at a higher resolution than the rest, a larger portion of frame buffer 140 may be assigned to that virtual display. If four virtual displays are requested at the same resolution, the frame buffer may be divided evenly into four portions. In the illustrated embodiment, two virtual displays (not shown) have been requested. To provide hardware support for the two virtual displays, display driver 124 partitions frame buffer 140 to include a first frame buffer portion 142 and a second frame buffer portion 144. The first frame buffer portion 142 is used to store video data associated with a first virtual display and the second frame buffer portion 144 is used to store video data associated with a second virtual display.

Once frame buffer 140 has been partitioned, display driver 124 may provide address pointers to the start and end of each frame buffer portion 142 and 144 of frame buffer 140 to operating system 122. Operating system 122 may then treat each frame buffer portion 142 and 144 as a separate frame buffers. Driver 124 may also report user-defined settings for each of the virtual displays, such as resolution, color depth, and such. Using support from display driver 124, operating system 122 may generate video data for each of the virtual displays separately. Operating system 122 generates frames of video data for the first virtual display and provides them to video controller 130 for storage in first frame buffer portion 142. Operating system 122 also generates frames of video data for the second virtual display and provides them to video controller 130 for storage in second frame buffer portion 144.

Video controller 130 includes hardware components for providing video to display device 170. Frame buffer 140 stores data associated with video frames to be displayed on display device 170. First frame buffer portion 142 includes only video data associated with the first virtual display. Second frame buffer portion 144 only includes video data associated with the second virtual display. A CRT controller 132 is used to generate appropriate data signals to provide video data in frame buffer portions 142 and 144 to display device 170. In one embodiment, the video data stored in frame buffer portions 142 and 144 must be organized into frames to be transferred. The frames may then be organized into lines of video for transmission to display device 170, through display port 150.

Display driver 124 is used to select a current virtual display to present through display device 170. In one embodiment, an event trigger is used to select the current virtual display. The event trigger may include a "hot-key" in which a pre-defined keystroke or keystroke sequence is pressed to activate one of the virtual displays. The event trigger may also include a mouse curser crossing an edge of a screen of a current virtual display, indicating another virtual display that exists in the direction that the curser has crossed is to become active. For example, if a left portion of the available desktop is assigned to the first virtual display and a right portion of the available desktop is assigned to the second virtual display, once the mouse curser crosses the right boundary of the screen of the first virtual display, the second display becomes active. When a virtual display becomes active, display driver 124 may report an associated portion of frame buffer 140 to CRT controller 132 as being active. For example, if the first virtual display becomes active, pointers associated with a portion of frame buffer 140 to be read by display device 170 are redirected to match first frame buffer portion 142. When the second virtual display becomes active, pointers are redirected to match second frame buffer portion 144.

CRT controller 132 provides video signals associated with the current active virtual display to display port 150. In one embodiment, display port 150 matches a particular display standard, such as a video graphics array (VGA) standard, or a digital video interface (DVI) standard. Display device 170 receives the video signals from display port 150, through display interface 160. A type of display port 150 may be selected to match a desired display interface 160 of display device 170. Display device 170 uses received video signals to generate video output on a screen of display device 170. Display device 170 may include a CRT display, a flat-panel display, or a digital projector. In one embodiment, system 100 includes a laptop. In one embodiment display device 170 is a display integrated into the laptop system. Accordingly, display port 150 and display interface 170 may include a physical connection internal to the laptop system. It should be noted that alternate forms of display devices may be used without departing from the scope of the present disclosure.

Figure 2:
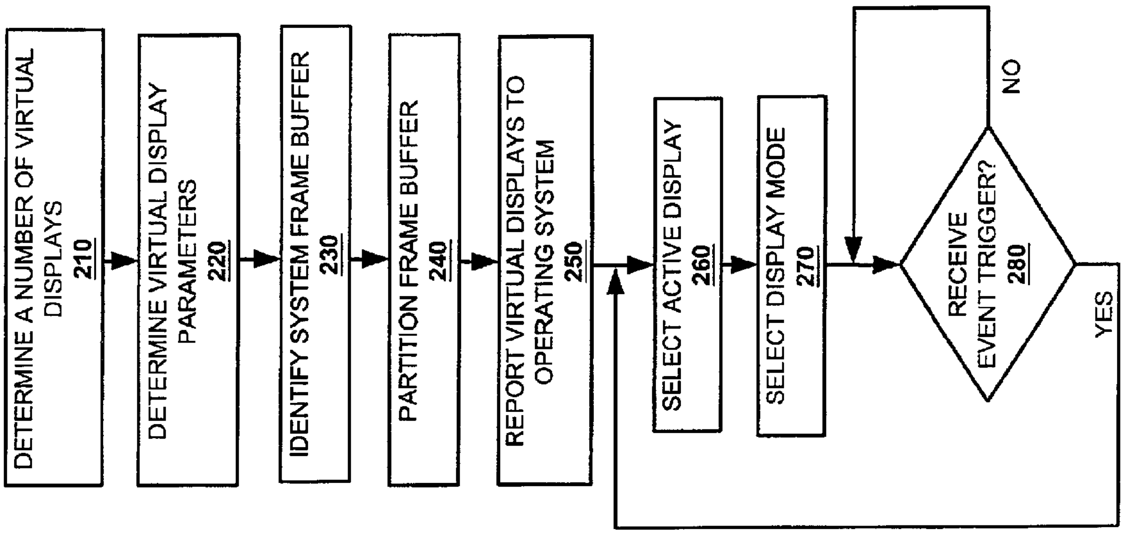
FIG. 2 is a flow diagram illustrating a method of providing multiple virtual display support on a system with a single display device, according to one embodiment of the present disclosure.

Referring now to FIG. 2, a flow diagram illustrating steps for supporting multiple virtual displays in software using a single display device is shown, according to one embodiment of the present disclosure. A display driver is provided for supporting multiple virtual displays using a single set of display hardware. The display driver partitions resources, such as a frame buffer, for each of the virtual displays. Video for each of the virtual displays is then sent to the display only for a virtual display that is considered currently active.

In step 210, the display driver determines a number of virtual displays to support. In one embodiment, the number of virtual displays is selected by a user through a setup menu associated with the display driver. It should be noted that a maximum number of virtual displays that may be supported without critically degrading system performance may be determined by analyzing the amount of resources available. For example, an amount of memory associated with a frame buffer may limit the maximum number of virtual displays which may be supported. In step 220, the display driver determines parameters associated with the virtual displays. The parameters may include resolution or color depth. The parameters may also include a type of event trigger that will be used by the display driver to select an active virtual display of the number of virtual displays. A user may select among parameter options through a setup menu. It should be noted that some parameters, such as a display resolution, may also be limited due to the maximum size of the frame buffer.

In step 230, the display driver identifies a frame buffer. The frame buffer may be associated with a set of video hardware used to provide video data to a display device. In one embodiment, the display driver receives addresses associated with the beginning and end of the frame buffer. In step 240, the display driver partitions the frame buffer into individual portions to support the number of virtual displays. Individual portions may be used to support particular virtual displays. The display driver may determine the size of the portions dependent on an amount of memory needed to support each virtual display. For example, a resolution assigned to a virtual display may need to be considered when allocating the size of a frame buffer portion for the virtual display. The display driver may also be used to track addresses associated with the beginning and end of each frame buffer portion.

In step 250, the display driver reports the virtual displays to an operating system. The operating system may include an operating system capable of supporting multiple connected display devices. The display driver provides the number of virtual displays to the operating system and associated parameters, including the addresses associated with the frame buffer portions. The operating system may treat the data returned by the display driver as data associated with physically connected display devices. The operating system may generate video associated with each virtual display independently and at the resolution reported by the display driver. The operating system may also store the generated video data for each virtual display at the addresses of the portions of the frame buffer reported by the display driver. The operating system may treat each frame buffer portion as an individual frame buffer associated with an individual display device.

In step 260, the display driver selects an active virtual display. The active virtual display may initially be set to a predetermined primary virtual display. The active virtual display may also be selected based on an event, such as a "hot-key" setting or the position of a mouse pointer on the system desktop, as will be discussed further in reference to FIG. 4. The portion of the frame buffer associated with the active virtual display is used to provide video data to the connected display device. In step 270, the display driver will set a display mode of the connected display device to match a display mode associated with the active virtual display. The display mode may include particular display settings, such as a display resolution and pixel depth, to be applied to the display device. The display mode may be stored as a driver variable associated with the virtual display. Each virtual display may have an associated display mode. The driver variable may be altered using a resolution control, as discussed further in reference to FIG. 5. In step 280, the display driver determines if an event trigger has been received. The event trigger may be related to a user pressing a particular "hot-key" or by the movement of a mouse pointer passed the boundary of a screen of a currently active virtual display. If an event trigger is not received, the display driver continues to allow the current virtual display to remain active. Alternatively, if an event trigger is received, the display driver attempts to determine what the new active virtual display is, such as in step 260.

Figure 3:
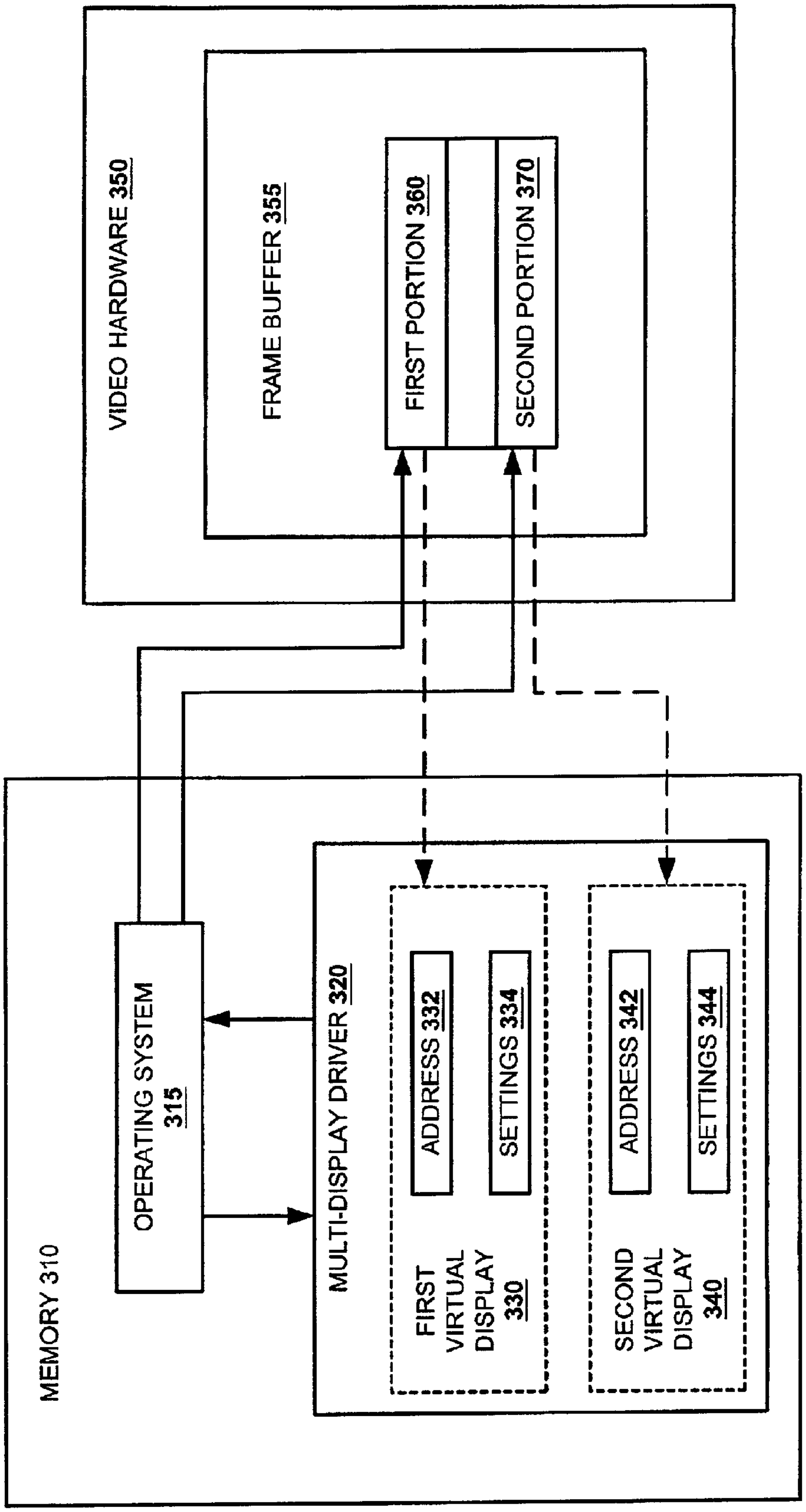
FIG. 3 is a block diagram illustrating a data flow for initializing multiple virtual display support on a system with a single display device, according to one embodiment of the present disclosure.

Referring now to FIG. 3, a block diagram illustrating a data flow for initializing multiple virtual display support on a system with a single display controller is shown, according to one embodiment of the present disclosure. Upon boot-up of an information handling system, such as system 100 (FIG. 1), an operating system 315 queries a display driver 320 to determine how many display devices are connected. Display driver 320 reports a number of virtual displays that have been requested by a user to operating system 315. Display driver 320 partitions a frame buffer 355 of video hardware 350 to support each of the requested virtual displays.

A user may select a number of virtual displays from display driver 320 running in memory 310. In one embodiment, a graphical user interface (GUI) is provided to the user to allow the user to select various options associated with the virtual displays. For example, a user may be presented with selecting a number of virtual displays to be supported. It should be noted that the number of virtual displays to be supported may be limited by system resources. For example, a minimum amount of frame buffer 355 may be needed to adequately support a single virtual display. As more virtual displays are supported, frame buffer 355 is partitioned into smaller portions and a quality of the video displayed may become degraded. Accordingly, a maximum number of supported virtual displays may be limited by a maximum memory size of frame buffer 355. In the embodiment illustrated in FIG. 3, a user selects to use two virtual displays, first virtual display 330 and second virtual display 340. In one embodiment, users also provide settings for each of the virtual displays. For example, users may define resolutions or color depths for each of the desired virtual displays. Display driver 320 may be used to track the settings. For example, display driver 320 may store settings 334 and 344 for first virtual display 330 and second virtual display 340, respectively.

Display driver 320 partitions frame buffer 355 into portions to support the virtual displays 330 and 340. For example, a first frame buffer portion 360 may be used to support video data associated with first virtual display 330. A second frame buffer portion 370 maybe used to support a second virtual display 340. It should be noted that other portions of frame buffer 355 may be reserved for other video data, such as storing bit-mapped objects for future display or storing video data for further processing. The size of portions of frame buffer 355 assigned to first and second frame buffer portions 360 and 370 may be selected dependent on settings 334 and 344 associated with first and second virtual displays 330 and 340, respectively. For example, if settings 344 indicate second virtual display 340 has a higher resolution than indicated by settings 334 for first virtual display 330, the amount of memory assigned to second frame buffer portion 370 may need to be greater than the amount of memory assigned to first frame buffer portion 360. Display driver 320 stores information regarding partitioned portions of frame buffer 355 associated with virtual displays. For example, display driver 320 may store memory addresses associated with the beginning and end of first frame buffer portion 360 in addresses 332 for first virtual display 330 and addresses associated with the beginning and end of second frame buffer portion 370 in addresses 342 for second virtual display 340. While two virtual drivers 330 and 340 are described for purposes of discussion, it should be appreciated that additional virtual displays may also be supported. Accordingly, frame buffer 355 would be partitioned to support portions for other virtual displays.

Display driver 320 receives a query from operating system 315 running in memory 310 regarding the number of connected display devices. Display driver 320 returns the number of desired virtual displays, such as first virtual display 330 and second virtual display 340, as the number of connected display devices for operating system 315. Display driver 320 also provides settings 334 and 344 associated with each virtual display and addresses 332 and 342. Operating system 315 may then generate video data for each virtual display independently, according to the settings provided. For example, operating system 315 may need to scale video data for first virtual display 330 to match a resolution indicated by settings 334. Operating system 315 then provides video data for each of the virtual displays 330 and 340 to video hardware 350, at addresses 332 and 334. Accordingly, operating system 315 may store video data associated with first virtual display 330 in first frame buffer portion 360 and video data associated with second virtual display 340 in second frame buffer portion 370.

Video hardware 350 includes components for providing video data stored in frame buffer 355 to a connected display device (not shown), through a CRT controller (not shown). Display driver 320 may be used to indicate which portion, first frame buffer portion 360 or second frame buffer portion 370, of frame buffer 355 should provide video data to the display device, as discussed further in reference to FIG. 4.

Figure 4:
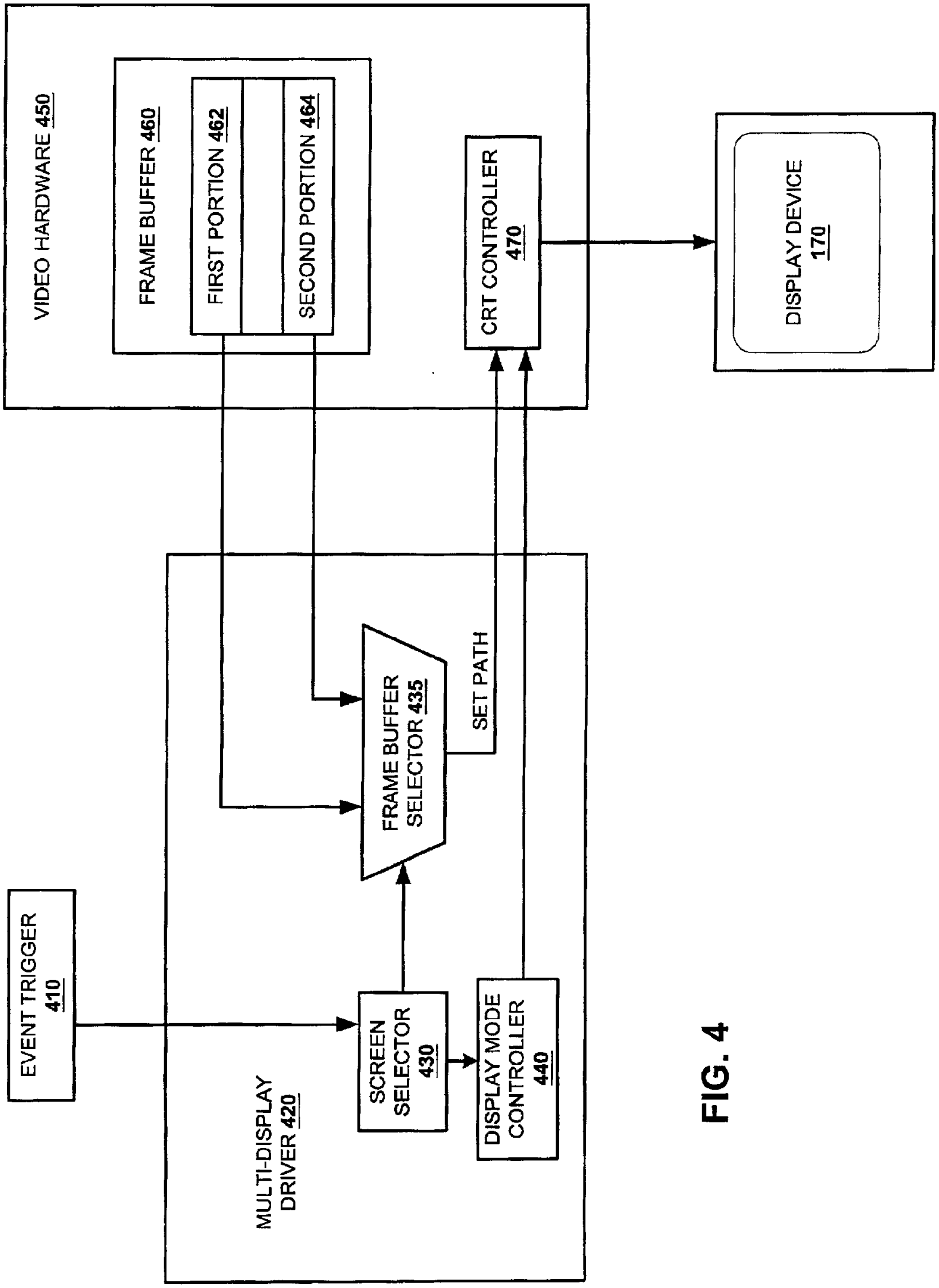
FIG. 4 is a block diagram illustrating a data flow for providing video data associated a virtual display of a plurality of virtual displays to a single connected display device, according to one embodiment of the present disclosure.

Referring now to FIG. 4, a block diagram illustrating data flow in a system to provide video data in portions of a frame buffer 460 to a display device 170 is shown, according to one embodiment of the present disclosure. Video data for different virtual displays is stored in different portions, such as first and second frame buffer portions 462 and 464, in frame buffer 460 of video hardware 450. A display driver 420 selects one of the virtual displays to be active. A portion of the frame buffer 460 associated with the active virtual display is used to provide video data for presentation on a display device 170.

A plurality of virtual displays is configured within an information handling system through a display driver 420. The display driver 420 partitions frame buffer 460 of video hardware 450 into several portions, such as frame buffer portions 462 and 464. Data for each virtual display is assigned to particular frame buffer portions. For example, video data associated with a first virtual display (not shown) may be assigned to first frame buffer portion 462 and video data associated with a second virtual display (not shown) may be assigned to second frame buffer portion 464, as previously discussed in reference to FIG. 3. In one embodiment, only video data from one virtual display is presented on display device 170 at any given time.

In one embodiment, display driver 420 selects a particular virtual display to be currently active. In one embodiment, particular events of the information handling system are monitored to determine which virtual display of the plurality of virtual displays to make active. An event trigger 410 indicates to display driver 420 that the active display may have changed. In one embodiment, windows associated with different applications are assigned to different virtual displays. For example, the first virtual display may be used for displaying programming code for editing and a second virtual display may be used for displaying a compiled program associated with the programming code being edited. An active display may be selected on the basis of activity. The event trigger 410 may be selected based on activity. A virtual display with an application showing high levels of activity, such as use of system resources or generating a request for user input may be set as the active virtual display.

The event trigger 410 may be based on the movement of a mouse pointer. In one embodiment, the system desktop is arranged so that different portions of the desktop are assigned to different virtual displays. For example, a left portion of the desktop may be assigned to the first virtual display and a right portion of the desktop may be assigned to the second virtual display. Accordingly, the location of the mouse pointer on the desktop may be used to determine which virtual display is the current active display. As the mouse pointer moves across a right boundary of the first virtual display, the second virtual display may be made active to display the mouse pointer. The event trigger 410 may include a predetermined "hot-key". Particular keystrokes may be assigned to indicate a users desire to switch among virtual displays. For example, a "control-F1" keystroke may be pressed to assign the first virtual display as the current active virtual display. A "control-F2" keystroke may be pressed to assign the second virtual display as the current active virtual display. The user may continue to type "hot-keys" to switch among available virtual displays.

Once the event trigger 410 is set, a screen selector 430 analyses the event to determine which virtual display is to be made active. Screen selector may apply a particular display mode to CRT controller 470 through a display mode controller 440. Display mode controller 440 includes specific display settings, such as a resolution setting, associated with the active virtual display. Display mode controller 440 may be used to apply the display settings of the identified virtual display to the display device, through CRT controller 470. Furthermore, the screen selector 430 assigns the identified virtual display to a frame buffer selector 435. Frame buffer selector 435 is used to select which portion, such as first frame buffer portion 462 or second frame buffer portion 464, of frame buffer 460 is to be read from. A proper video data path, between a selected frame buffer portion 462 or 264 is set in CRT controller 470. Video data from the selected frame buffer portion may then be provided to CRT controller 470 of video hardware 450. CRT controller 470 includes circuitry for generating video signals associated with the video data for transmission to display device 170. In one embodiment, the video data from frame buffer 460 is organized into sets of fields to be displayed. The fields include lines of video data that are transmitted sequentially to display device 170. Alternatively, pixel data may be provided to display device 170, indicating digital display information for each pixel of display device 170, such as for a liquid crystal display screen. Display device 170 decodes the video data received from CRT controller 470 and generates frames of video for presentation to the user.

Figure 5:
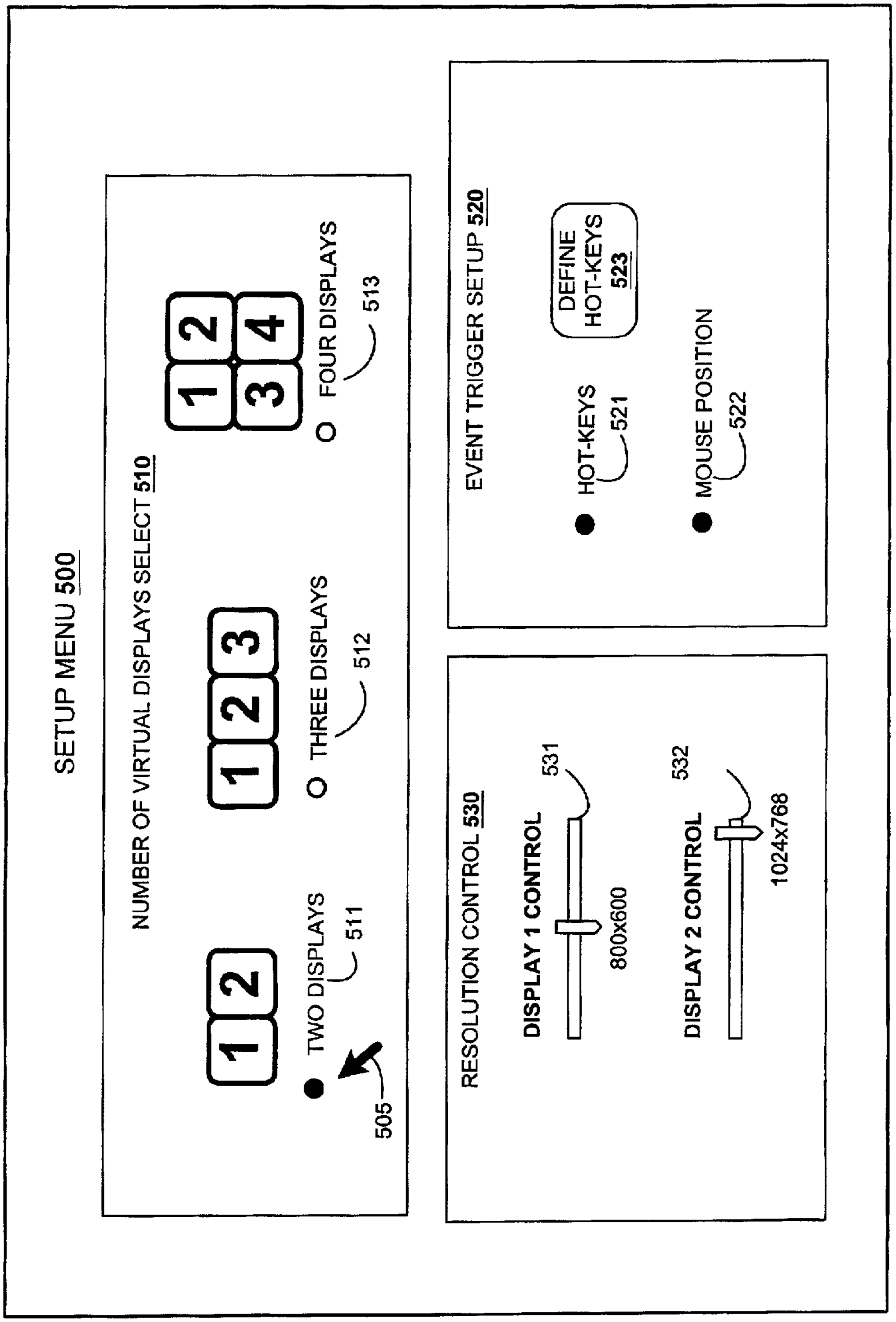
FIG. 5 is a block diagram illustrating a menu screen for setting preferences associated with a display driver capable of supporting multiple virtual displays using a single display device, according to one embodiment of the present disclosure.

Referring now to FIG. 5, a block diagram illustrating portions of a setup menu for setting preferences associated with a display driver to provide video data from multiple virtual displays on a single display device is shown, according to one embodiment of the present disclosure. As previously discussed, a display driver is used to generate support for virtual displays to be used to extend a current desktop. In one embodiment, a setup menu 500 is provided to a user. The setup menu 500 includes a user interface that allows the user to set various controls regarding the virtual displays to be supported. In one embodiment, setup menu 500 includes a graphical user interface (GUI) in which a user selects options using a computer mouse to control an on-screen pointer, such as mouse pointer 505.

Setup menu 500 may include a virtual display select 510 for identifying a number of virtual displays requested by a user. In one embodiment, the user is provided a set of options regarding virtual display configurations. In the illustrated example, the user may select a two-display configuration 511, a three-display configuration 512, or a four-display configuration 513. It should be noted that other configurations may be provided and the ones described herein are provided for purposes of discussion; however, the number of virtual displays that are provided may be limited by the resources accessible to the display driver. For example, the amount of memory available from a frame buffer associated with video hardware may limit the number of supported display devices, as previously discussed.

Setup menu 500 may also include a resolution control 530. Resolution control 530 allows a user to select different resolutions for each of the supported virtual displays. For example, since the two-display configuration 511 was selected in the illustrated example, two sets of display controls, "display 1 control" 531 and "display 2 control" 532, are provided for configuring each of the chosen virtual display devices. In the illustrated example, the user may drag a lever to select a resolution. For example, an 800×600 resolution is selected for the first virtual display through "display 1 control" 531 and a 1024×768 resolution is selected for the second virtual display through "display 2 control" 531. The number of resolution controls may be increased to allow more supported virtual displays to be configured. In an alternate embodiment, the user is also provided with an option to alter available color depth for the virtual displays. It should be noted that display resolution and color depth may be limited dependent on the amount of resources available to the display driver, as previously discussed.

Setup menu 500 may also include an event trigger setup 520. Event trigger setup 520 allows a user to select a type of event on which to switch among available virtual displays. For example, a hot-key enable 521 may be used to enable hot-keys for switching among virtual displays. Hot-keys are pre-determined keystrokes that may be assigned to different virtual displays. For example a "control-F1" keystroke may select a first virtual display and a "control-F2" keystroke may force a switch to a second virtual display. A "define hot-keys" option 523 may be used to allow the user to define hot-keys for each supported virtual display. Alternatively, the hot-keys may include a set of pre-defined keystrokes. A "mouse position" option 522 may be selected to allow the event trigger to be based on the movement of a pointer, such as mouse pointer 505, across the desktop. For example, the movement of the pointer past the boundary of the screen of one virtual display may trigger the need to display a second virtual display. It should be appreciated that other trigger events may be provided without departing from the scope of the present disclosure. Furthermore, while setup menu 500 has been shown and described, it should be appreciated that various methods of enabling a user to customize driver parameters may also be used without departing from the scope of the present disclosure.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that the system described herein has the advantage of supporting multiple virtual displays with a single connected display device.

In the preceding detailed description of the embodiments, reference has been made to the accompanying drawings that form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A method comprising partitioning a frame buffer into a first portion and a second portion associated with a first virtual display and a second virtual display, wherein a space allocated to at least the first portion is based on one or more parameters of at least the first virtual display;

storing a first set of display data in the first portion of the frame buffer, wherein the first set of display data is associated with the first virtual display;

storing a second set of display data in the second portion of the frame buffer, wherein the second set of display data is associated with the second virtual display;

selecting one of the first virtual display or the second virtual display to be presented by a display device;

when the first virtual display is selected, providing data from the first portion of the frame buffer to a display controller for presentation on the display device; and when the second virtual display is selected, providing data from the second portion of the frame buffer to the display controller for presentation on the display device.

2. The method as in claim 1, wherein the frame buffer is associated with video hardware connected to the display device.

3. The method as in claim 1, wherein selecting one of the first virtual display or the second virtual display includes identifying an event trigger.

4. The method as in claim 3, wherein the event trigger includes identifying a particular first pre-defined set of keystrokes to select the first virtual display and a second pre-defined set of keystrokes to select the second virtual display.

5. The method as in claim 3, wherein the event trigger includes a mouse position.

6. The method as in claim 3, wherein the event trigger includes activity associated with an application on one of the first virtual display or the second virtual display.

7. The method as in claim 1, wherein an operating system desktop is expanded over the first and second virtual displays.

8. The method as in claim 1, wherein the first set of display data is associated with a first application and the second set of display data is associated with a second application, the first application being different than the second application, and the first application not being associated with the second application.

9. The method as in claim 1, wherein the one or more parameters include a resolution assigned to the first virtual display.

10. The method as in claim 1, wherein the one or more parameters include a color depth assigned to the first virtual display.

11. A method comprising:

determining a number of virtual displays in a plurality of virtual displays to be supported;

partitioning a frame buffer into a plurality of frame buffer portions, wherein the plurality of frame buffer portions includes a first frame buffer portion associated with a first virtual display of the plurality of virtual displays and a second frame buffer portion associated with a second virtual display of the plurality of virtual displays;

reporting the number of virtual displays as a number of display devices;

providing a first address associated with the first frame buffer portion, wherein the first address is reported as an address of a first frame buffer associated with a first display device; and providing a second address associated with the second frame buffer portion, wherein the second address is reported as an address of a second frame buffer associated with a second display device;

wherein at any given time, only one of the number of virtual displays is to be displayed.

12. The method as in claim 11, further including:

selecting one of the first virtual display or the second virtual display;

when the first virtual display is selected, providing data associated with the first frame buffer portion; and when the second virtual display is selected, providing data associated with the second frame buffer portion.

13. The method as in claim 12, wherein selecting one of the first virtual display or the second virtual display includes identifying a vent trigger.

14. The method as in claim 13, wherein the event trigger includes identifying a particular first pre-defined set of keystrokes to select first virtual display and a second pre-defined set of keystrokes to select the second virtual display.

15. The method as in claim 13, wherein the event trigger includes a mouse position.

16. The method as in claim 13, wherein the event trigger includes an activity associated with an application displayed on one of the first virtual display or the second virtual display.

17. The method as in claim 11, wherein partitioning the frame buffer includes determining a space to assign to a portion of the frame buffer dependent on parameters of an associated virtual display.

18. A The method as in claim 17, wherein the parameters include a resolution assigned to each virtual display.

19. The method as in claim 17, wherein the parameters include a color depth assigned to each of the virtual displays.

20. The method as in claim 11, wherein the number of display devices to be supported is based on an available size of the frame buffer.

21. The method as in claim 11, wherein the number of display devices to be supported is based on virtual display parameters.

22. The method as in claim 21, wherein the parameters include a resolution assigned to each virtual display.

23. The method as in claim 21, wherein the parameters include a color depth assigned to each of the virtual displays.

24. The method as in claim 11, wherein reporting the number of virtual displays includes providing the number of virtual displays to an operating system as the number of display devices in a multiple display configuration.

25. A system comprising:

a data processor having an input/output buffer;

memory having an input/output buffer coupled to the input/output buffer of the data processor, said memory having a program of instructions including:

a display driver to:

report a multiple display configuration, wherein said multiple display configuration includes support for a plurality of virtual displays;

partition a frame buffer into a plurality of frame buffer portions;

assign a different virtual display of the plurality of virtual displays to each of the frame buffer portions of the plurality of frame buffer portions;

a video controller coupled to the input/output buffer of the data processor, said video controller having:

a frame buffer having the plurality of frame buffer portions, wherein each frame buffer portion of the plurality of frame buffer portions is to store display data associated with an assigned virtual display of the plurality of virtual displays; and a display controller to provide display data from a frame buffer portion of the plurality of frame buffer portions to a display device; and wherein said display controller is to display a selected virtual display from the plurality of virtual displays dependent on an event trigger.

26. The system as in claim 25, wherein said display driver further is to select a virtual display from the plurality of virtual displays for presentation and said display data provided by said display controller is associated with the selected virtual display.

27. The system as in claim 26, wherein the event trigger includes identifying a particular first pre-defined set of keystrokes to select a first virtual display of the plurality of virtual displays and a second pre-defined set of keystrokes to select a second virtual display of the plurality of virtual displays.

28. The system as in claim 26, wherein the event trigger includes a mouse position.

29. The system as in claim 26, wherein the event trigger includes an activity associated with an application displayed on one of the virtual displays of the plurality of virtual displays.

30. The system as in claim 25, wherein said display driver reports said multiple display configuration to an operating system.

31. A computer readable medium tangibly embodying a program of instructions, said program of instructions including instructions to:

determine a number of virtual displays in a plurality of virtual displays to be supported;

partition a frame buffer into a plurality of frame buffer portions, wherein the plurality of frame buffer portions include a first frame buffer portion associated with a first virtual display of the plurality of virtual displays and a second frame buffer portion associated with a second virtual display of the plurality of virtual displays;

report the number of virtual displays as a number of display devices in a multiple display configuration;

provide a first address associated with the first frame buffer portion, wherein the first address is reported as an address of a first frame buffer associated with a first display device of the multiple display configuration; and provide a second address associated with the second frame buffer portion, wherein the second address is reported as an address of a second frame buffer associated with a second display device of the multiple display configuration;

wherein at any given time, only one of the number of virtual displays is to be displayed.

32. The computer readable medium as in claim 31, further including instructions to:

select one of the first virtual display or the second virtual display;

provide data associated with the first frame buffer portion when the first virtual display is selected; and provide data associated with the second frame buffer portion when the second virtual display is selected.

33. The computer readable medium as in claim 32, wherein a trigger event is used to select one of the first virtual display or the second virtual display.

34. The computer readable medium as in claim 33, wherein the event trigger includes identifying a particular first pre-defined set of keystrokes to select the first virtual display and a second pre-defined set of keystrokes to select the second virtual display.

35. The computer readable medium as in claim 33, wherein the event trigger includes a mouse position.

36. The computer readable medium as in claim 33, wherein the event trigger includes an activity associated with an application displayed on one of the first virtual display or the second virtual display.

37. The computer readable medium as in claim 31, wherein the instructions to partition the frame buffer includes determining a space to assign to a portion of the frame buffer dependent on parameters of an associated virtual display.

38. The computer readable medium as in claim 37, wherein the parameters include a resolution assigned to each virtual display.

39. The computer readable medium as in claim 37, wherein the parameters include a color depth assigned to each of the virtual displays.

40. The computer readable medium as in claim 31, wherein the number of display devices to be supported is based on an available size of the frame buffer.

41. The computer readable medium as in claim 31, wherein the number of display devices to be supported is based on virtual display parameters.

42. The computer readable medium as in claim 41, wherein the parameters include a resolution assigned to each virtual display.

43. The computer readable medium as in claim 31, wherein the instructions to report the number of virtual displays includes instructions to report the multiple display configuration to an operating system.

* * * * *

UNITED STATES PATENT AND TRADEMARK OFFICE

CERTIFICATE OF CORRECTION

PATENT NO. : 6,970,173 B2
APPLICATION NO. : 09/954685
DATED : November 29,2005
INVENTOR(S) : Alec A. CIOLAC It is certified that error appears in the above-identified patent and that said Letters Patent is hereby corrected as shown below:

Column 12, line 41: Please change the word "vent" to "event"

Column 12, line 56: Please change "A The method" to "The method"

Signed and Sealed this

Fifteenth Day of August, 2006

JON W. DUDAS
*Director of the United States Patent and Trademark Office*